United States Patent Office

3,306,947
Patented Feb. 28, 1967

3,306,947
ISOPRENE PRODUCTION FROM
2-METHYLPENTENE-2
Laimonis Bajars, Princeton, Louis J. Croce, East Brunswick, and Maigonis Gabliks, Highland Park, N.J., assignors to Petro-Tex Chemical Corporation, Houston, Tex., a corporation of Delaware
No Drawing. Filed Sept. 18, 1962, Ser. No. 224,542
7 Claims. (Cl. 260—680)

This invention relates to a process for the preparation of isoprene by the thermal cracking of 2-methylpentene-2.

It is known that isoprene may be produced by the thermal cracking of olefins as well as by the dehydrogenation of isopentane and isopentene. In all of these methods, there are various problems and disadvantages which seriously restrict their use on a commercial basis. For example, in the thermal cracking process, there is some coking and hydrocarbon degradation which greatly lowers the yield and purity of the final product. Processes for the dehydrogenation of isopentane to produce isoprene usually require a catalyst regeneration cycle and high operating temperatures. These two factors tend to reduce the activity of the catalyst and result in lower yields and selectivities of isoprene. The production of isoprene by the dehydrogeneration of isopentene has two main disadvantages. One is the costly requirement of pure isopentene and the second is the problem of product purification. The process of separating isoprene from certain isopentene isomers is an involved and expensive procedure. There are also several condensation processes capable of producing isoprene. These include the acetone-acetylene process, the methylethylketone-formaldehyde process, and the isobutylene-formaldehyde process. Commercial acceptance of these processes has been slow due to the high cost of the starting materials.

It is an object of this invention to provide an improved and efficient process for the production of isoprene which avoids many of the disadvantages of these processes and provides high purity isoprene in high yields. It is further the object of this invention to provide an economical and commercially competitive process for the production of high purity isoprene. Other objects of this invention will be apparent from the disclosure which follows.

It has been found that these objects are attained by the vapor phase thermal cracking of isohexenes at reduced pressure with a specific amount of chlorine atoms and a particular type of metal catalyst.

An advantage of this invention is that the isohexene feed, utilized in this invention, may be readily and economically obtained by the dimerization of propylene. An additional advantage is that this invention utilizes in its operation chlorine atoms derived from elemental chlorine or chlorine compounds which are relatively inexpensive and readily available in commercial quantities. The active chlorine atoms may be introduced into the reaction zone as elemental chlorine, organic chlorides, or as an inorganic chloride solution. This factor simplifies, not only the manner of introducing the chlorine atoms into the reaction zone, but also simplifies the recovery and recycle of the source of chlorine atoms.

An essential feature of this invention is the use of a specific catalyst comprising the Periodic Table metals or metal compounds of elements of Groups V–B, VI–B, VII–B, VII, and mixtures thereof, in combination with a metal or compounds of elements selected from the Periodic Table Groups I–A, II–A and mixtures thereof. These groups are based on the periodic classification of the elements found in the Handbook of Chemistry and Physics (Chemical Publishing Company) pages 448–449 of the 41st edition (1959). The metal compounds may be compounds such as the oxides, phosphates, hydroxides, halides such as chlorides, and the like. Examples of Group V–B, VI–B, VII–B, and VIII compounds that may be employed in formulating this catalyst or contact mass include vanadium pentoxide, vanadium tetrachloride, chromic oxide, chromic chloride, molybdenum oxide, manganous oxide, manganese chloride, manganese phosphide, ferrous chloride, ferrous oxide, ferric oxide, nickel oxide, nickel selenide, nickel chloride, cobalt phosphide, cobaltous chloride, cobalt oxide and the like.

The compounds of Group I–A and II–A, known as the activator, may be in the form of oxides, hydroxides, halides and the like. Examples of compounds that may be employed in activating the above metals include lithium chloride, lithium oxide, sodium oxide, sodium chloride, calcium hydroxide, calcium chloride, potassium chloride, potassium hydroxide, rubidium oxide, rubidium chloride, beryllium oxide, beryllium chloride, strontium hydroxide, strontium chloride, barium hydroxide, barium chloride and the like.

Many metal compounds that decompose upon heating or those that will react with, or be replaced by, chlorine to form their respective chlorides have been found useful in the practice of this invention. Examples of such compounds include strontium sulfite, sodium iodide, calcium bromide, calcium acetate, manganous formate, manganic sulfate, barium bromate, barium nitrite, beryllium acetate, vanadium oxychloride, chromic sulfite, ferrous acetate, ferrous iodide, ferrous nitrite, ferric sulfate, nickel formate, nickel orthophosphate, and the like.

The amounts of metals or metal compounds from Groups I–A and II–A that may be combined with metals or metal compounds from Groups V–B, VI–B, VII–B and VIII may be varied quite widely. Amounts as low as 1 weight percent of alkali or alkaline earth metals or their compounds based on the total catalyst weight have been used, although alkali or alkaline earth metals or their compounds as high as 95 weight percent based on the total catalyst weight, excluding the weight of any carrier, may be employed. Amounts between about 3 to 50 weight percent of alkali or alkaline earth metals or their compounds have given excellent results and are preferred. More specifically, the demethanation catalyst may contain .01 to 150 atoms selected from elements of Group I–A and II–A of the Periodic Table per atoms of elements selected from Groups V–B, VI–B, VII–B and VIII of the Periodic Table, although atoms ratios of .03 to 50, respectively, are preferred. For example, a catalyst comprising a mixture of 85 weight percent ferrous chloride and 15 weight percent potassium chloride gave excellent yields of isoprene at 625° C. while a catalyst comprised of a mixture of 96 weight percent molybdenum oxide and 4 weight percent potassium chloride gave excellent yields of isoprene at 700° C. The solid catalysts may be prepared by either coating inert carriers or supports with a solution or slurry of the desired materials and then dried, or may be pelletized in dry form by methods known in the art. The catalytic surface may be present in a variety of forms such as in the form of particles. The amount and size of the catalytic particles may be varied over wide limits depending primarily upon the activity of the particular catalyst and the type of catalyst bed employed. For example, the size of catalyst particles may be varied from about 15 microns to about 2 inches at its broadest point. Generally the smaller particles are used when a fluidized bed is used. The reaction zone may contain catalysts as such or may contain a mixture of catalyst and some inert material. Good results have also been obtained by using layers consisting of metal catalysts and an inert material throughout the reaction zone.

The amount of solid catalyst utilized in this invention may be widely varied. Generally the amount of catalyst present in the reaction zone will be greater than about 75 square feet of catalytic surface per cubic foot of reaction zone containing the catalyst. Although much higher ratios may be used, it is preferred to utilize at least 150 square feet of catalytic surface per cubic foot of reaction zone containing the catalyst.

Another essential feature of this invention is that the gram atom to gram mol ratio of chlorine to 2-methylpentene-2 must be greater than 0.05:1. It has been fund that when the gram atom to gram mol ratio of chlorine to 2-methylpentene-2 is below 0.05:1, there is no detectable catalytic advantage in cracking 2-mehtylpentene-2 to produce isoprene and, in some instances, actually tends to inhibit the formation of isoprene. Good yields of isoprene have been obtained with chlorine to 2-methylpentene-2 gram atom to gram mol ratios of 0.05:1 to 2:1, and gram atom to gram mol ratios of 0.1:1 to 0.5:1. Gram atom to gram mol ratios of 0.2:1 to 0.8:1 are preferred. In the practice of this invention, either hydrogen chloride or elemental chlorine is preferably employed as the source of the active chlorine atoms, however, any compound which will decompose in the reaction zone and liberate active chlorine atoms such as methyl chloride, ammonium chloride and the like may be used. The use of the term chlorine atoms in the specification and claims refers to atoms of chlorine (Cl) regardless of the source of these chlorine atoms. For example, the introduction of one gram mol of hydrogen chloride or methyl chloride into the reaction zone is equivalent to one gram atom of chlorine or the introduction of one gram mol of elemental chlorine into the reaction zone is equivalent to two gram atoms of chlorine.

Still another essential feature of this invention is that the reaction be conducted at a 2-methylpentene-2 partial pressure of not greater than one-quarter of the total pressure when the total system pressure is on atmosphere or higher, and less than one-quarter atmosphere when the total system pressure is below one atmosphere. For example, when 2-methylpentene-2 is demethanated to isoprene and methane under a total system pressure of 80 p.s.i., a 2-methylpentene-2 partial pressure of not more than 20 p.s.i. would have to be maintained. Also, for example, if the total pressure is one atmosphere or 0.25 atmosphere, a 2-methylpentene-2 partial pressure of not more than 0.25 atmosphere would be necessary. Although a 2-methylpentene-2 absolute pressure as high as 7 atmospheres may be used in this invention, subatmospheric pressures of 2-methylpentene-2 between about 10 mm. of mercury and 380 mm. of mercury absolute are preferred. It is still further preferred to maintain a 2-methylpentene-2 partial pressure of about 15 mm. of mercury absolute to about 200 mm. of mercury absolute. Excellent isoprene yields were obtained, under normal operating conditions, when the 2-methylpentene-2 partial pressure was maintained between about 20 mm. of mercury absolute to about 80 mm. of mercury absolute. It has been found to be particularly advantageous to maintain the desired partial pressure with inert diluents, however, a vacuum may be used and if desired, a combination of the two may be employed. In addition to the diluent, any compound utilized in producing the active chlorine atoms contributes in maintaining the desired partial pressure of the 2-methylpentene-2. Any material which is substantially inactive in the presence of the other reactants and reaction products may be used as a diluent. Examples of suitable inert diluents that may be used are helium, nitrogen, methane, steam, and the like. Steam has given excellent results and is definitely preferred. The amount of steam utilized in this invention may be varied between about 1:1 to 50:1 mols of steam per mol of 2-methylpentene-2. Mol ratios of between about 5:1 to 30:1 mols of steam per mol of 2-methylpentene-2 are preferred. For example, a mol ratio of steam to 2-methylpentene-2 of between 10:1 and 20:1 has given excellent yields of the isoprene under normal operating conditions.

This invention may be conducted at a reaction temperature between about 400° C. to about 850° C. While good yields of isoprene have been obtained at temperatures between about 500° C. and 750° C., the reaction is preferably maintained at a reaction temperature between about 600° C. and 700° C. The reaction temperature is the maximum temperature recorded in the reaction zone during the cracking process.

While the flow rate of the reactants may be widely varied, good results have been obtained with contact or residence times between about 0.01 second and 3 seconds. Generally residence or contact times between about 0.03 second and 0.3 second are preferred. Residence time is the calculated dwell time the reactants spend in the reaction zone calculated at the reaction temperature and pressure, assuming that the volume of feed and the volume of reaction products are the same. The reaction zone is defined as that part of the reactor which contains the metal catalyst. The rate of 2-methylpentene-2 introduced into the reaction zone may also be expressed by the term liquid hourly space velocity (LHSV) which is defined as the volume of liquid 2-methylpentene-2 calculated at 25° C. and 760 mm. pressure passing through the reaction zone per hour. LHSV's of between 0.01 and 5 gave good results, but LHVS's of about 0.1 to 2 are preferred.

The 2-methylpentene-2 may be added to the reaction zone separate from the material producing the chlorine atoms or as a mixture thereof. Preferably the 2-methylpentene-2 and the material producing the chlorine atoms are heated separately and introduced individually into the reaction zone.

A variety of reactors may be used in the practice of this invention. Generally large diameter reactors which can be easily charged and emptied of catalyst are preferred, but tubular reactors of small diameter may also be used. Any desired reactor that can be efficiently operated without creating excessive flow restrictions or back pressures may be used and good results will be obtained. A fluidized bed type reactor may also be advantageously used in the operation of this invention.

The following specific embodiments are incorporated in the examples. Percent conversion refers to the mols of 2-methylpentene-2 consumed per 100 mols of 2-methylpentene-2 fed to the reactor, percent selectivity represents the mols of isoprene formed per 100 mols of 2-methylpentene-2 consumed, and percent yield refers to the mols of isoprene formed per 100 mols of 2-methylpentene-2 fed. The precent yield of isoprene may also be expressed as the product of percent conversion and percent selectivity. All quantities of chlorine expressed are calculated as gram atoms of chlorine even though the chlorine may have been introduced into the reaction zone as a chlorine compound. Unless otherwise stated, all runs were made in a Vycor[1] glass reactor. Heat was supplied to the Vycor reactor by a dual unit electric furnace, each heating unit being 12 inches long and individually controlled by a voltage regulator.

The 2-methylpentene-2 was vaporized and preheated by passing the liquid 2-methylpentene-2 into a stream of superheated steam prior to its introduction into the mixing zone. The steam was generated in a 1 inch internal diameter stainless steel tube approximately 11 inches long jacketed by an electric furnace and controlled by a voltage regulator. The chlorine atoms were introduced as hydrogen chloride by vaporizing and preheating the hydrogen chloride before it was passed into the mixing zone. The feed mixture consisting of 2-methylpentene-2, steam, and hydrogen chloride was then intermixed and

---

[1] The term Vycor is the trademark for a glass manufactured by Corning Glass Works. It is comprised of approximately 96 percent silica which has been chemically washed and then fired at high temperatures.

passed through the heated reaction zone. The reaction products were then passed through a warm water contained at a temperature of about 75° C. to condense out most of the steam. This condenser was followed by an ice water trap to remove the higher boiling hydrocarbons which in turn was followed by a Dry-Ice-acetone trap which collected the lower boiling materials and the isoprene. The uncondensed gases were measured by means of a wet test meter. Samples of the reaction products were withdrawn from the effluent line at a point between the water condenser and the ice water trap and analyzed in a Perkin-Elmer vapor fractometer model 154. The isoprene vapor analysis was substantiated by analyzing the lower boiling materials collected in the Dry Ice-acetone trap. More specifically, the demethanation reactor consisted of a 1 inch I.D. Vycor glass tube 36 inches in length. An electric furnace enclosed about 24 inches of the Vycor tube leaving unenclosed a 4 inch section above the furnace and an 8 inch section below the furnace. The lower one-third portion, or about 8 inches, of the 24 inch section within the furnace contained the activated catalyst; the remaining 16 inches within the furnace was filled with 6 mm. x 6 mm. Vycor Raschig rings. The unenclosed end sections of the tube were empty. The activated metal catalyst rested on a porous retaining plate located 8 inches from the bottom of the Vycor tube. In all of these examples, except where stainless steel wool is used, the actives were coated on 6 mm. x 6 mm. Vycor Raschig rings by depositing thereon an aqueous slurry or solution of the activated catalytic material. The coated Raschig rings were then placed in a porcelain dish and evaporated to dryness over an open flame. The reaction temperature was controlled by thermocouples located in a thermowell passing through the center of the reaction zone and connected to an electronic controller and recorder. The temperature of reaction, for purposes of this invention, is the maximum temperature measured in the reaction zone during the cracking reaction. All flow rates were based on the total free volume of the eight inch catalyst bed excluding the volume occupied by the 9 mm. diameter thermowell. The following examples are only illustrative of the manner in which the process of the invention may be carried out and of the quality of the products obtained from its application.

*Example 1*

To establish a control, preheated feed materials consisting of steam, vaporized 2-methylpentene-2 and diluted hydrogen chloride were introduced separately into the top of a 36 inch Vycor reactor. The 24 inch section of the reactor, enclosed within the furnace, was filled with 6 mm. x 6 mm. Vycor Raschig rings and heated so that the uppermost 16 inches was maintained at a preheat temperature of about 400° C. and the lower 8 inches was maintained at a reaction temperature of about 625° C. The 2-methylpentene-2 flow rate was maintained at a liquid hourly space velocity (LHSV) of 0.5. The hydrogen chloride was added at a rate equivalent to 0.52 gram atoms of chlorine per gram mol of 2-methylpentene-2 with a steam to 2-methylpentene mol ratio of 20:1. An analysis of the reaction gas effluent, which was also substantiated by an analysis of the Dry Ice-acetone trap condensate, showed that 21 mol percent of the 2-methylpentene-2 had reacted to produce an isoprene yield of 17 mol percent.

*Example 2*

Example 1 was repeated with the exception that the 24 inch bed of Vycor Raschig rings was replaced with a 24 inch bed consisting of a 16 inch top layer of 6 mm. x 6 mm. Vycor Raschig rings and an 8 inch bottom layer of 6 mm. x 6 mm. Vycor Raschig rings coated with an aqueuos slurry consisting of 15 weight percent of potassium chloride and 85 weight percent of ferrous chloride. The 8 inch bottom layer, containing the activated ferrous chloride catalyst, was hetaed to a reaction temperature of 625° C. while the 16 inch preheat and mixing zone containing the Vycor Raschig rings was heated to 400° C. All other conditions were identical to the control run and held constant. An analysis of the effluent showed that 56 mol percent of the 2-methylpentene-2 had been cracked producing a 45 mol percent yield of isoprene with a selectivity of about 80 mol percent.

*Example 3*

Example 2 was repeated with the exception that the reaction zone temperature was increased from about 625° C. to 675° C. The preheat temperature of 400° C. was held constant. The analysis showed that 81 mol percent of 2-methylpentene-2 was cracked to produce an isoprene yield of 55 mol percent with a selectivity of about 67 mol percent.

*Example 4*

Example 2 was repeated with the exception that the activated ferrous chloride catalyst was replaced by 6 mm. x 6 mm. Vycor Raschig rings coated with an aqueous slurry consisting of 4 weight percent potassium chloride and 96 weight percent molybdenum oxide. The reaction zone temperature was increased to 700° C. while the preheat and mixing zone temperature was held constant at 400° C. An analysis of the reactor effluent indicated that 80 mol percent of the 2-methylpentene-2 had been cracked to produce an isoprene yield of 56 mol percent with a selectivity of 69 mol percent.

*Example 5*

Example 4 was repeated with the exception that the activated metal catalyst consisted of 6 mm. x 6 mm. Vycor Raschig rings coated with a slurry consisting of 8 weight percent of potassium chloride and 92 weight percent of ammonium metavanadate. The analysis indicated that 74 mol percent of 2-methylpentene-2 had been cracked to produce an isoprene yield of 54 mol percent with a selectivity of 73 mol percent.

*Example 6*

Example 4 was repeated with the exception that the activated metal catalyst consisted of 6 mm. x 6 mm. Vycor Raschig rings coated with a concentrated aqueous solution consisting of 12 weight percent of potassium chloride and 88 weight percent of manganous acetate. The analysis indicated that 70 mol percent of 2-methylpentene-2 had been cracked to produce an isoprene yield of 52 mol percent with a selectivity of 75 mol percent.

*Example 7*

Example 4 was repeated with the exception that the activated metal catalyst consisted of 6 mm. x 6 mm. Vycor Raschig rings coated with a concentrated aqueous solution consisting of 19 weight percent of potassium chloride and 81 weight percent of ferrous sulfate. The analysis indicated that 75 mol percent of 2-methylpentene-2 had been cracked to produce an isoprene yield of 52 mol percent with a selectivity of 70 mol percent.

We claim:

1. A process for the preparation of isoprene which comprises contacting at a temperature between about 500° C. to 850° C. a mixture consisting essentially of 2-methylpentene-2 and chlorine atoms in the gaseous phase in a reaction zone containing a catalyst comprising a material selected from the group consisting of vanadium, chromium, molybdenum, manganese, iron cobalt, and nickel; compounds of vanadium, chromium, molybdenum, manganese, iron, cobalt, and nickel; and mixtures thereof, and activated with a material selected from the group consisting of metals of Periodic Table Groups I–A, II–A; compounds of the metal of Periodic Table Groups I–A and II–A; and mixtures thereof in amount of at least on weight percent of the catalyst, the partial pressure of the said 2-methylpentene-2 being not greater than one-quarter of the total pressure when the total pressure is one atmosphere or greater, and being less than one-quarter atmosphere when the total pressure is less than one atmosphere, the gram atom to gram mol ratio of said chlorine atoms to said 2-methylpentene-2 being greater than 0.05 gram atoms of chlorine per gram mol of 2-methylpentene-2.

2. A process for the preparation of isoprene which comprises contacting at a temperature between about 500° C. to 750° C. a mixture consisting essentially of 2-methylpentene-2 and chlorine atoms in the gaseous phase in a reaction zone containing a catalyst comprising a material selected from the group consisting of vanadium, chromium, molybdenum, manganese, iron, cobalt, and nickel; the oxides phosphates, hydroxides and halides of vanadium, chromium, molybdenum, manganese, iron, cobalt and nickel; and mixtures thereof, and activated with a material selected from the group consisting of metals of Periodic Table Groups I-A, II-A; the oxides, hydroxides and halides of the metals of Perodic Table Groups I-A, and II-A; and mixtures thereof in amount from about 3 to 50 weight percent of the catalyst, the partial pressure of the said 2-methylpentene-2 being not greater than one-quarter of the total pressure when the total pressure is one atmosphere or greater, and being less than one-quarter atmosphere when the total pressure is less than one atmosphere, the gram atom to gram mol ratio of said chlorine atoms to said 2-methylpenetene-2 being between about 0.05:1 to 2:1 grams atoms of chlorine per gram mol of 2-methylpentene-2.

3. A process for the preparation of isoprene which comprises contacting at a temperature between about 500° C. to 750° C. a mixture consisting essentially of 2-methylpentene-2 and chlorine atoms in the gaseous phase in a reaction zone containing a catalyst comprising a material selected from the group consisting of vanadium, chromium, molybdenum, manganese, iron, cobalt, and nickel, and mixtures thereof, and activated with a material selected from the group consisting of metals of Periodic Table Groups I-A, II-A; the oxides, hydroxides and halides of the metals of Periodic Table Groups I-A and II-A; and mixtures thereof in amount of 3 to 50 percent of the catalyst, the partial pressure of the 2-methylpentene-2 being not greater than one quarter of the total pressure when the total pressure is one atmosphere or greater, and being less than one-quarter atmosphere when the total pressure is less than one atmosphere, the gram atom to gram mol ratio of said chlorine atoms to said 2-methylpentene-2 being greater than 0.05 gram atoms of chlorine per gram mole of 2-methylpentene-2.

4. A process for the preparation of isoprene which comprises contacting at a temperature between about 500° C. to 750° C. a mixture consisting essentially of 2-methylpenetene-2 and chlorine atoms in the gaseous phase in a reaction zone containing a catalyst comprising a material selected from the group consisting of vanadium, chromium, molybdenum, manganese, iron, cobalt, and nickel; the oxides phosphates, hydroxides and halides of vanadium, chromium molybdenum, manganese, iron, cobalt and nickel; and mixtures thereof, and activated with a material selected from the group consisting of metals of Periodic Table Groups I-A and II-A; the oxides, hydroxides, and halides of the metals of Periodic Table Groups I-A and II-A; and mixtures thereof in amount of 3 to 50 percent of the catalyst, the partial pressure of the said 2-methylpentene-2 being between about 10 mm. and 380 mm. of mercury absolute and the gram atom to gram mol ratio of said chlorine to said 2-methylpentene-2 being between about 0.1:1 and 0.5:1 gram atoms of chlorine per gram mol of 2-methylpentene-2.

5. A process for the preparation of isoprene which comprises contacting at a temperature between about 600° C. to 700° C. a mixture consisting essentially of 2-methylpentene-2, chlorine atoms in the gaseous phase, and steam in a reaction zone containing a catalyst comprising a material selected from the group consisting of vanadium, chromium, molybdenum, manganese, iron, cobalt, and nickel, and mixtures thereof, and activated with a material selected from the group consisting of metals of the Periodic Table Groups I-A, II-A, and mixtures thereof in amount of 3 to 50 percent of the catalyst, the partial pressure of the said 2-methylpentene-2 being between about 20 mm. and 80 mm. of mercury absolute, the gram atom to gram mol ratio of said chlorine atoms to said 2-methylpentene-2 being about 0.1:1 to 0.5:1 gram atoms of chlorine per gram mol of 2-methylpentene-2 and the mol ratio of said steam to said 2-methylpentene-2 being between about 1:1 to 30:1 mols of steam per mol of 2-methylpentene-2.

6. A process for the preparation of isoprene which comprises contacting at a temperature between about 600° C. to 700° C. a mixture consisting essentially of 2-methylpentene-2, chlorine atoms in the gaseous phase and steam in a reaction zone containing a catalyst comprised of a mixture of potassium chloride and ferrous chloride, the partial pressure of the said 2-methylpentene-2 being between about 20 mm. and 80 mm. of mercury absolute, the gram atom to gram mol ratio of said chlorine atoms to said 2-methylpentene-2 being between about 0.1:1 to 0.5:1 gram atoms of chlorine per gram mol of 2-methylpentene-2 and the mol ratio of said steam to said 2-methylpentene-2 being between about 1:1 to 30:1 mols of steam per mol of 2-methylpentene-2.

7. A process for the preparation of isoprene which comprises contacting at a temperature between about 600° C. to 700° C. a mixture consisting essentially of 2-methylpentene-2, chlorine atoms in the gaseous phase and steam, in a reaction zone containing a catalyst comprising a mixture of from 1 to 50 percent of potassium chloride, the balance being ferrous chloride, the partial pressure of the said 2-methylpentene-2 being between about 20 mm. and 80 mm. of mercury absolute, the gram atom to gram mol ratio of said chlorine atoms to said 2-methylpentene-2 being between about 0.2:1 to 0.8:1 gram atoms of chlorine per gram mol of 2-methylpentene-2 and the mol ratio of said steam to said 2-methylpentene-2 being between about 5:1 to 20:1 mols of steam per mol of 2-methylpentene-2.

References Cited by the Examiner

UNITED STATES PATENTS

| 3,205,280 | 9/1965 | Wattimena et al. | 260—680 |
|---|---|---|---|
| 3,207,806 | 9/1965 | Bajars | 260—680 |
| 3,207,811 | 9/1965 | Bajars | 260—680 |

FOREIGN PATENTS

| 831,249 | 3/1960 | Great Britain. |
|---|---|---|
| 868,566 | 5/1961 | Great Britain. |

PAUL M. COUGHLAN, JR., *Primary Examiner.*